June 16, 1964
R. J. HOPPER
3,137,852
FRANGIBLE TARGET
Filed Nov. 26, 1954
3 Sheets—Sheet 1
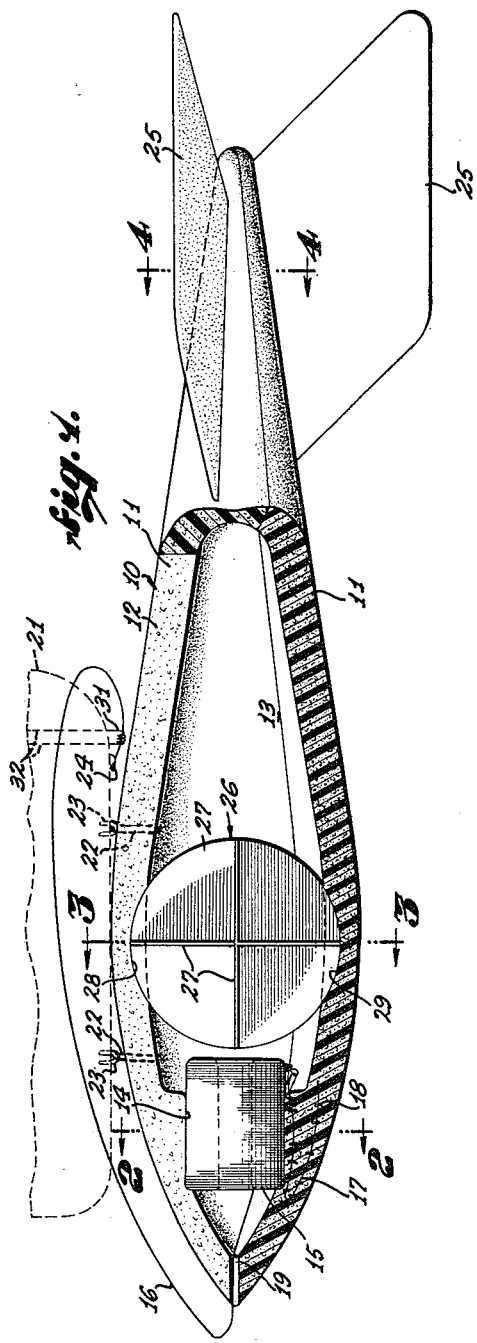
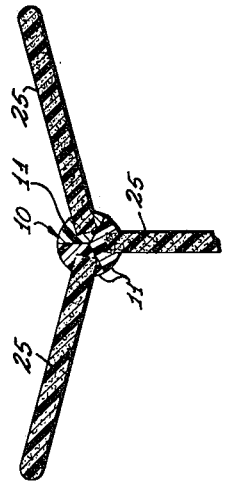
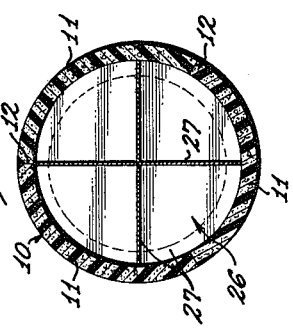
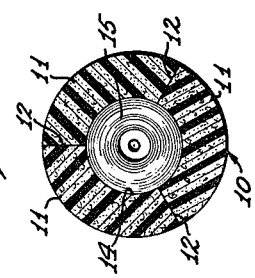
ROBERT J. HOPPER,
INVENTOR.
BY
ATTORNEY.

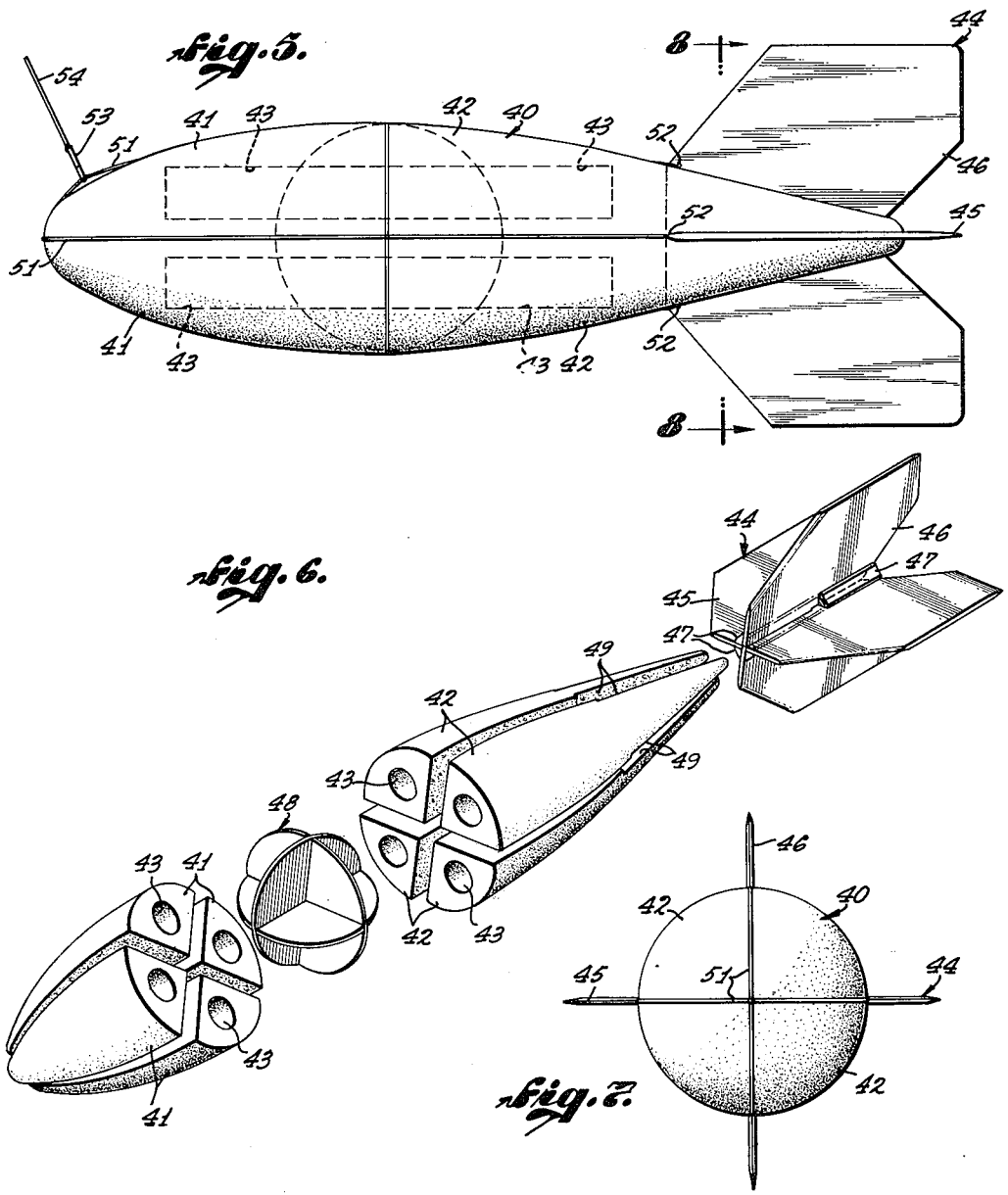

June 16, 1964  R. J. HOPPER  3,137,852
FRANGIBLE TARGET
Filed Nov. 26, 1954  3 Sheets-Sheet 3
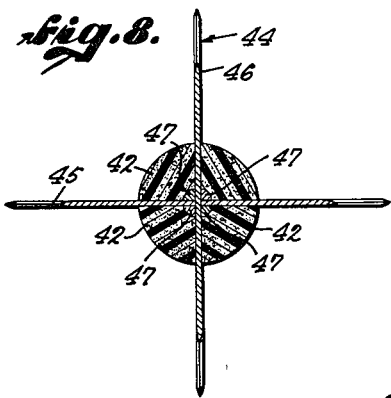
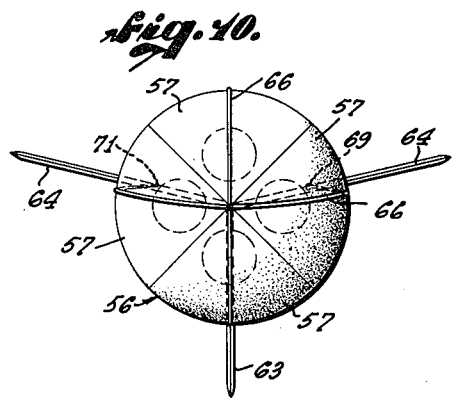
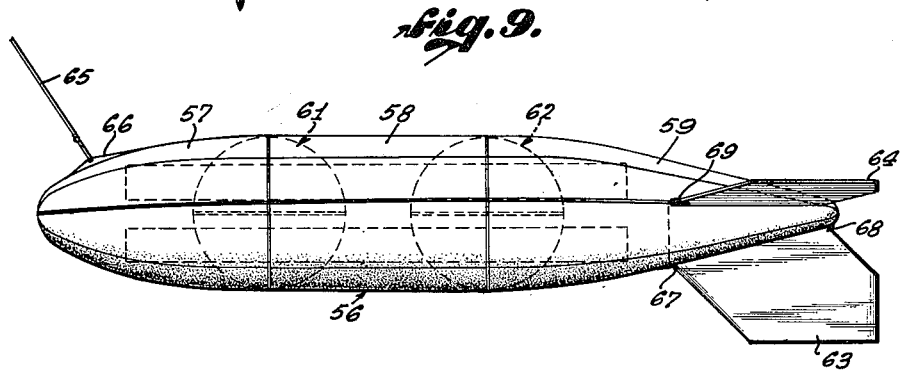
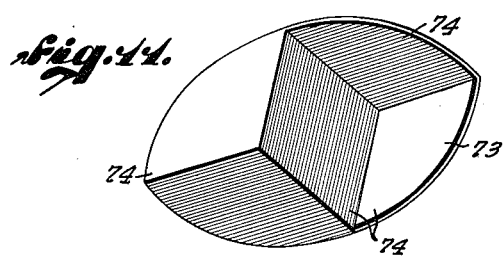
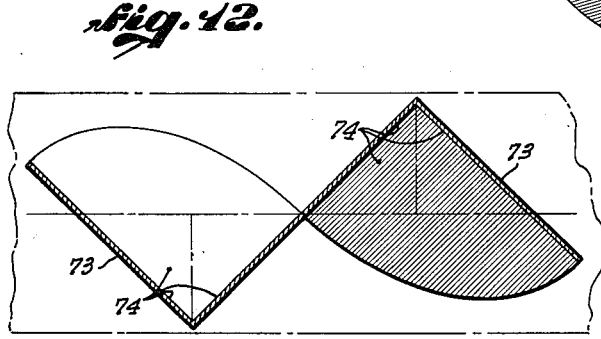
ROBERT J. HOPPER,
INVENTOR.
BY
ATTORNEY.

United States Patent Office 3,137,852
Patented June 16, 1964

1

3,137,852
FRANGIBLE TARGET
Robert J. Hopper, Pacific Palisades, Calif., assignor to Del Mar Engineering Laboratories, Inc., Los Angeles, Calif., a corporation
Filed Nov. 26, 1954, Ser. No. 471,234
11 Claims. (Cl. 343—18)

This invention relates to aerial targets and more particularly to such a target which is towed by one aircraft and used to train pilots of other aircraft in automatic fire control equipment.

In present day fighter aircraft, fire control, whether it be rocket, cannon or machine gun, is governed generally by automataic control systems. Novice pilots are initially trained in the use of fire control equipment by electronic tracking devices which allow the pilot to make an interceptor run on a simulated enemy aircraft. In many training programs, the simulated enemy aircraft is an actual aircraft fitted with elements increasing the radar reflectivity of the aircraft.

To avoid possible air collisions, the control and tracking systems of the attacking aircraft are adjusted so that this airplane does not actually fly an interceptor course relative to the simulated enemy aircraft. Thus, a novice pilot does not actually simulate an intercepting action with the "enemy aircraft" but merely a theoretic one for he does not actually approach the aircraft he is attempting to intercept and destroy. Notwithstanding the safety measure undertaken, malfunctioning systems and equipment and inexperience of the pilots undergoing training have produced collisions resulting in damage or destruction of aircraft and in some cases, death of pilots.

The present invention provides a target which will simulate an enemy aircraft in the training of novice pilots and can be used with present day tracking and automatic fire control systems. The target furthermore, can be directly tracked by the pilot undergoing training and at the actual interception the target will be in the view of the pilot so that he not only "sees" the target in the radar screen but can actually see the target, if weather conditions permit. This allows a more realistic training program for it permits a pilot to actually intercept a simulated enemy aircraft and approach that aircraft as would be done in actual combat, without the tremendous psychological hazard associated with present methods.

In other training programs the pilot undergoing training actually flies his aircraft into combat attitude relative to a tow target and fires rockets, cannon shells and other armament at the target. In these programs, the attacking aircraft closely approaches the target and here again collisions have occurred between the target and the attacking aircraft. These collisions have also resulted in the destruction of aircraft and the death of numerous pilots.

The target of the present invention is also useful in the latter described training program and, although in both types of training programs there is a danger of the aircraft colliding with the target in flight, such a collision entails no danger to the pilot or structure of the aircraft for the target is so formed as to disintegrate if struck by the aircraft.

The material of which the body of the target is formed is one having low impact resistance and a relatively high volume-weight ratio, which is somewhat brittle and fragile but yet sufficiently rigid to maintain a formed shape. The material now preferred is one of the rigid cellular plastics, formed by foaming the plastic. Such foamed plastic materials, after completion of the foaming operation, will hold a formed shape but are easily disintegrated, particularly when subject to impact loads such as occur in the use of the present target when the target is struck by a portion of the aircraft structure.

To permit the target to be used with present day radar tracking systems, radar reflectors are formed internally of the target and these reflectors are so constituted as to be incapable of reinforcing the body of the target. The reflectors may be extremely thin aluminum films formed either by a painting operation or by foils properly formed and mounted within the body structure. In one embodiment of the invention herein illustrated, the foil sheets forming the reflectors are reinforced and supported by internal wall means of the body element, while in another form the sheets of foil are laminated with sheets of other materials having a strength merely sufficient to support the weight of the laminations.

The aerial target of the present invention may be towed by conventional present day light weight tow lines although in one embodiment illustrated, the target is towed by a cord or strand formed of a material such as nylon. In this form of the target of the present invention, a coil of nylon cord is carried within the body element of the target and this cord is unwound from the coil, once the target is launched, by the drag of the target. The end of the cord opposite to the end attached to the towing aircraft is properly anchored within the body of the target to the end that the target is not disconnected from the cord at the time the entire length of the cord is unwound from the coil.

In the embodiment of the target of the present invention in which the towing strand is originally carried within the body of the target, the free end of the towing strand is anchored to an external store support element such as a pylon or the like carried by the aircraft. The strand is passed through a coil resistance wire mounted exteriorly of the pylon and electrically connected into a circuit of the aircraft. At the completion of a training exercise, the target can be released by energization of the resistance coil for the heat developed thereby incinerates the cord and thus separates the target from the aircraft.

Other features and advantages of the present invention will be hereinafter apparent from the following description, particularly when taken in connection with the accompanying drawing, in which FIGURE 1 is an elevational view, partly in section, showing one embodiment of the target of the present invention;

FIGURE 2 is a section taken along line 2—2 of FIGURE 1;

FIGURE 3 is a section taken along line 3—3 of FIGURE 1;

FIGURE 4 is a section taken along line 4—4 of FIGURE 1;

FIGURE 5 is an elevational view of another embodiment;

FIGURE 6 is an exploded view of the components of the target shown in FIGURE 5;

FIGURE 7 is a front elevational view of the target shown in FIGURE 5;

FIGURE 8 is a section taken along line 8—8 of FIGURE 5;

FIGURE 9 is an elevational view of a further embodiment of the target of the present invention;

FIGURE 10 is a front elevational view of the target shown in FIGURE 9;

FIGURE 11 is a perspective view of one form of a radar reflector unit used with the target of the present invention;

FIGURE 12 is a sectional view of the unit of FIGURE 11.

The target of the present invention, and particularly the embodiment shown in FIGURES 1 through 4 of the accompanying drawing, comprises a body member 10 formed of a plurality of substantially identical body sections 11, herein shown as three in number. Each body section is formed of a foamed or expanded plastic having an extremely high volume-weight ratio. A number of present day plastics can be used to form the body sections and these plastics through a suitable foaming agent can be foamed or expanded to form a low density cellular mass. Such a foamed plastic, although fragile, is yet sufficiently rigid to hold a formed shape. Body sections of the present invention have been formed of foamed cellulose acetate and polystyrene with excellent results. The density of the foamed or expanded plastic can be varied and the body 10 should have such a density as to substantially disintegrate under impact blows such as are encountered when an aircraft collides with the target.

The body sections 11 can be formed either through a molding process or by machining a preformed mass of the expanded plastic to the desired shape and configuration. The sections 11, however formed, are held assembled to form the body 10 by a suitable bonding agent applied to the contacting surfaces 12 of the assembled body sections.

The body formed when the sections are cohesively secured together includes a relatively large internal chamber 13 and the defining wall means of this chamber adjacent the forward end thereof provides a cylindrical internal well 14 for holding a preformed cylindrical coil 15 of cord or strand material 16 preferably of nylon. The coil 15, in the illustrated embodiment of the present invention, is formed by wrapping the cord 16 about a mandrel which is removed after the coil is completed so that the opposite ends of the cord 16 are each accessible. The one end of the cord 16 is connected to an anchoring unit preferably formed of a length of cord 17 having a plurality of anchoring elements 18 which may consist of knots spacedly formed along the cord 17. Substantially the entire length of the cord 17 is embedded in the expanded plastic of the one body section 11 and it will be seen now that the embedded cord 17 forms a means for connecting one end of the cord 16 to the body of the target.

This form of the anchoring unit is used where the body sections are formed by a molding process for the cord 17 can be easily embedded within the material of the body section. Other anchoring means would be used where the body sections were formed by a machining operation.

The end of the cord 16 opposite to the anchored end is taken from the internal convolutions of the coil and passed through a passageway 19 leading from the chamber 13 to the nose section of the target body. The form of the target shown in FIGURE 1 is intended to be mounted to the towing aircraft through means carried by that aircraft for supporting external stores such as jettisonable tanks, bombs, rockets and the like. In the illustrated embodiment of the invention, the target is shown mounted to an under-wing pylon 21 which includes a pair of remotely operable hook-like members 23 normally used for supporting an external store such as a jettisonable tank.

The target in the form now being described, is provided with a pair of spaced support elements 22 in the form of loops of a strand such as a nylon cord anchored in a body section 11. The loops 22, where the body section is molded, would be substantially embedded by the material of the body section at the time the section was molded. Where the body section is formed through a machining operation, the wall of the section would be punctured to permit insertion of the opposite ends of the strand elements through the wall section after which the opposing ends would be interconnected. The loops 22 form, as should now be understood, eye elements or shackles to be engaged by the support members 23 of the pylon 21. Although not shown, suitable sway braces can be employed to further support the target in the flight of the aircraft and before the target is launched in the training exercise.

The end of the cord 16 extending through the passageway 19 is brought over the target body and the end anchored to the pylon 21 as indicated at 24. This anchorage can be effected by a small element threadedly mounted to the wall of the pylon 21.

To release the target from the towing aircraft, the pilot disengages the hook-like members 23 from the loops 22 which, as will be understood, permits the target to drop away from the aircraft and the cord 16 is thereafter unwound from the coil 15 by the drag of the target. The cord 16 will continue to be unwound from the coil 15 until the entire length of the cord has been unwound and the target is towed by the aircraft at a distance from the aircraft equal to the length of the cord 16.

To stabilize the target as it is towed, the configuration of the target structure of FIGURE 1 includes a plurality of fins 25 equal in number to the body sections 11. The fins 25 are preferably formed of the same material used to form the body sections, that is a foamed plastic. The material of the fins 25, however, may have a greater density than the material of the body sections to render the fins more resistant to the loads induced thereinto as the target is towed in flight. The fins 25 are thus separately formed from the body sections and subsequently assembled with the body sections.

In the now preferred method of forming the target, each body section is formed with an elongate slot of a width substantially equal to the root portions of the fins 24. The root portions of the fins are anchored in these slots through a bonding agent of a type which cohesively acts to hold the fins assembled with the body sections. This bonding agent, in effect, fuses the material of the fins with the material of the body sections to the end that the fins are substantially integral with the body sections.

As will be now seen, the target contains no metallic elements and to increase the reflectivity of the target to propagated or transmitted waves, such as used in radar systems today, it is now preferred to incorporate into the body of the target, a wave reflector unit 26. This unit may comprise a plurality of disc-like elements 27 so formed and assembled to provide groups of three normally intersecting planar surfaces. The reflector unit is preferably formed of low strength material incapable of reinforcing the target body against disintegrating impact forces and in the now preferred form of the unit, sheets of a material such as corrugated paper are used. The corrugated paper is laminated with a metallic foil, such as aluminum, and the corrugated paper thus acts as support means for the extremely thin low strength foil. The paper laminate is necessary as the reflector unit 26 spans the chamber 13 and is only partially supported by the material forming the body elements 11. This is clearly shown in FIGURE 1 of the drawing and it will be seen that the body sections are formed with groove elements 28 and 29 for supporting diametrically opposite marginal portions of the reflector unit 26.

The form of the target of FIGURE 1 is not intended to be retrieved at the conclusion of a training exercise but is disconnected from the towing aircraft. In the now preferred form of the present invention, the target is separated from the towing aircraft by means which incinerate the tow line formed by the nylon cord 16 at a point closely adjacent the anchorage point 24. In the illustrated embodiment of the invention, the means used to incinerate the tow line comprise a resistance element 31 carried exteriorly of the plyon 21 and electrically connected through the leads 32 to a source of current carried by the aircraft. To release the target from the towing aircraft, it is merely necessary to energize the resistance element 31 and the heat of the energized element is sufficient to incinerate the cord 16 and thus separate the target from the towing aircraft.

It will now be seen that the target described is one which is formed of a low density, frangible material and which has a low impact strength. The target, although it will hold a formed shape, yet is easily disintegrated if struck by the aircraft engaged in the training exercise without damage to the aircraft. Although the target will disintegrate if a collision occurs, yet the target can be used with tracking systems employing transmitted waves and the means used to reflect the waves do not reinforce the target body or present a hazard to the aircraft if a collision with the target occurs. An additional advantage of making the described tow target of low density material is that the resulting tow target is so light that it may be easily lifted, handled and carried by one man. This fact greatly simplifies and expedites the mounting of a tow target on a towing aircraft.

In the embodiment of the target of the present invention shown in FIGURES 5 through 8, the body member 40 is formed of a plurality of body sections, each formed of a foamed plastic of the same physical characteristics as the body sections of the previously described embodiment of the target. Thus, as clearly shown in FIGURE 6, the body member 40 is formed of four forward sections 41 and four aft body sections 42. The body sections 41 and 42 are preferably cored as indicated at 43 to reduce the weight of each section. The section 41, when assembled, form the forward or nose portion of the target, while the sections 42 form the aft or tail portion of the target.

To stabilize the target as it is towed, the embodiment now being described includes a stabilizing fin assemblage 44, comprising four fin members, each identical in shape and contour. In the assembly illustrated, the fins are formed of plate sections 45 and 46, each formed with an inwardly directed medial slot to permit the plates 45 and 46 to be assembled into the form shown. To hold the plates in the desired assembled position, small gusset elements 47 substantially triangular in cross section are adhesively secured in the four corners formed by the assembled plates 45 and 46.

In the now preferred embodiment of the form of the target being described, the plates 45 and 46 are each formed of a low strength material such as balsa wood. This wood, as is well known, is substantially rigid in laminated sheet form but yet disintegrates or breaks up under impact blows. Not only are the plates 45 and 46 formed of balsa wood, but the gussets 47 as well so that the entire fin assembly is formed of frangible material.

To increase the reflectivity of the target to propagated or transmitted waves, such as commonly used in radar systems today, it is again preferred to incorporate into the body formed by the sections 41 and 42 a wave reflector unit 48. The reflector unit 48 may comprise a plurality of circular disc elements of a metallic foil such as aluminum, so formed as to provide, as in the unit 26, a plurality of groups of three normally related surfaces. In the assembly of the body 40, the reflector unit 48 is positioned between the adjacent longitudinal planar surfaces of the body sections 41 and 42 with a portion thereof disposed between the contiguous or adjacent end faces of the body sections.

It will be seen, referring now to FIGURE 6, that when the body sections 41 and 42 are assembled, the reflector element 48 is carried internally of the target body at a point somewhat medially of the longitudinal axis thereof. As in the earlier described embodiment of the target, the body sections 41 and 42 may be bonded together through a suitable bonding element or adhesive agent and once assembled the planar surfaces of the body sections support and reinforce the foil sheets making up the reflector unit 48. In the assembly operation, the plates 45 and 46 forming the fins 44 are positioned between the sections 42, the faying surfaces of the latter being cut away as indicated at 49 to permit reception of the plates 45, 46, and the gussets 47.

To permit the target to be attached to a towing cable or the like without introducing concentrated loads in the fragile body sections, the opposite ends of a pair of cords 51 are suitably anchored to the leading edges of the plates 45 and 46, as indicated at 52, and are extended forwardly and longitudinally of the body 40 to form a cage-like constraining element carried in engagement with the exterior surfaces of the body member. It will thus be seen that the cords 51 also act to hold the fin assembly against separation from the target body and that the cords transmit the tensile forces into the fin assembly to thus relieve the more fragile body sections of such forces.

As the target shown in FIGURES 5 through 8 is symmetrical any one of the cords 51 can be used for securing a hook element 53 attached to the free end of a tow cable 54 to connect the target to a towing airplane. In this form of the invention, the body itself does not carry the tow line as in the form of the target shown in FIGURE 1 although if desired, this embodiment of the target could be supported and released from the towing aircraft by means identical to the means shown in FIGURE 1. In such form, the target now being described would be supplied with loops of cord similar to the loops 22 and the target could be disconnected from the tow line by a resistance element in the same manner as is the target of FIGURE 1.

FIGURES 9 and 10 show another embodiment of the tow target of the present invention. In this form of the invention, the body 56 comprises a plurality of body sections similar to the sections 41 and 42 earlier described. Here, however, the target is made up of body sections 57 which, when assembled, form the forward or nose section of the target, body sections 58 which form an intermedial or central portion of the body and sections 59 which make up the aft section of the target. This body arrangement permits the use of two reflector units 61 and 62 which may be identical to the reflector unit 48 previously described. The use of two reflector units increases the radar reflectivity of the target which is necessary in some types of training programs, particularly where it is desired to track targets initially towed relatively long distances from the simulated attacking aircraft. The body sections 57, 58 and 59 may be secured together in the assembled relationship by some suitable bonding agent, and if desired, the circumferentially extending lines of jointure can be covered with a suitable tape, not shown.

In the form of the target shown in FIGURES 9 and 10, the target is not symmetrical for only three stabilizing fin elements are used. The one fin 63 is relatively small in size as compared with the other two fins 64 and the chord plane of this fin passes through the longitudinal axis of the body member of the target. The fins 64 are identical and the chord plane of each fin passes through the longitudinal axis of the body member with the chord planes, as best seen in FIGURE 10, forming a positive dihedral angle. The fins 64 are preferably larger in span than the fin 63 and this greater span, together with the positive dihedral angle, so aerodynamically stabilizes the target so as to maintain the same in an attitude in which the fin 63 extends vertically downward in the towed flight of the target. This attitude is aerodynamically taken by the target so long as the point of attachment of the tow line to the target body is adjacent the forward or nose section of the target.

The fins 63 and 64 are here again preferably formed of balsa wood or some other low strength material. The fins in this embodiment of the invention thus may be separately formed and mounted to the body of the target by insertion of the root portions thereof in slits formed in the three normally lower body sections 59. Any means desired may be used to hold the root portions of the fins 63 and 64 in the body sections and, in the now preferred form of the invention, an adhesive agent is used to bond the root portions to the walls of the slits.

As in the form of the invention shown in FIGURES 6 through 8, the stresses induced into the target by a tow line 65 are taken by cord or strand elements 66, one of which is attached to the normally vertically disposed fin 63 as indicated at 67 and then is passed forwardly around the nose of the target to extend rearwardly to a point of attachment 68 on the trailing or rear edge of the vertically extending fin 63. A second strand element 66 is attached as indicated at 69 to the leading edge of the one fin element 64 and is then passed forwardly about the target to extend rearwardly on the opposite side of the target to a point of attachment 71 on the leading edge of the other of the fins 64. It will be seen, referring now to FIGURE 6, that the chords or strands 66 actually pass medially of each body section and act to hold the body sections against separation, that is, the cords 66 during the towing operation augment the bonding action of the agent holding the sections assembled. As in the just described embodiment of the invention, the tow cable or line 65 carries a hook element to be engaged under one of the strands 66 for attaching the target to the towing aircraft through the line 65.

In the embodiments of the invention heretofore described, the reflector units have been formed by metal foil either reinforced as explained during the description of the reflector unit 26 by sheets of a low strength material such as corrugated paper, or reinforced and supported by the planar surfaces of the body sections. Efficient reflector units can be formed by other means and used in the target of the present invention in the place of the reflector units previously described. For example, there is shown in FIGURE 11 a reflector unit which can be substituted for the reflector units 26, 48, 61, and 62, by appropriate change of the body member, which comprises an assemblage of sheet-like members 73, the exposed surfaces of which carry a metallic film in the form of a covering such as paint, carrying metallic particles and which when set and hardened forms surfaces highly reflective of transmitted or propagated waves such as used in present day radar systems.

It will be seen that the reflector unit shown in FIGURE 11 differs from the reflector units heretofore described in that the unit is formed of but two groups of three normally intersecting surfaces 74. This unit has a greater reflectivity for the surfaces 74 can be substantially larger for a given target body than the surfaces of the previously described units. It will be seen, by a comparison of FIGURES 12 and 6, that each surface of the reflector unit of FIGURE 12 has a major dimension substantially larger than the radius of the target body, shown in phantom lines in FIGURE 12, while in the unit 48 the major dimension of the surfaces of the that unit are somewhat less than the radius of the target body.

In the reflector unit of FIGURE 11, however, the signal wave reflected is of maximum strength in a zone coinciding substantially with the axis of theoretical cones, the apex of each coinciding with the point of intersection of a group of the three intersecting surfaces 74. Thus, in the reflector unit of FIGURE 11, if mounted in the illustrated physical disposition relative to the target body shown in phantom, would provide maximum strength signals to waves impinging on the reflector unit in substantially diametrically opposite transmission paths. This type of reflector unit is intended to be used with targets of the type shown in FIGURES 9 and 10, that is, those targets which are aerodynamically stabilized to assume a preselected attitude in the towed flight. As such a target, through the stabilizing fins used, will set up or create a preselected reference plane, the reflector units may be so mounted within the target body as to provide maximum strength signals only when the transmitted waves impinge upon the target at preselected impingement angles relative to the longitudinal axis thereof. For example, a reflector unit of the type shown in FIGURE 11 could be so mounted within the target body as to reflect or return signals only when the attacking aircraft was approaching the target from either side thereof in an intersecting level flight course at substantially 90° to the axis of the target.

It should be understood that the directional type of reflector unit shown in FIGURE 11 may comprise any number of groups of surfaces and can also be formed of aluminum foil laminated with some supporting structure such as the corrugated paper shown or of foil alone if the body sections of the target are formed so as to support and reinforce the foil.

Although not specifically described, it will also be seen that the target of the embodiment shown in FIGURES 1 through 4 may also be stabilized through the fin arrangement described for the embodiment of the target shown in FIGURES 9 and 10. It might also be mentioned here that the fins of all embodiments illustrated can, if desired, be molded integral with the body sections and, therefore, formed of a foamed or expanded plastic.

It should now be seen that all embodiments of the present invention provide a target of non-metallic frangible material which will disintegrate if struck by an aircraft in flight without damage to the aircraft. The target of the present invention thus is one which can be used in fire control training programs without fear that a collision between the target and the aircraft engaged in the program will result in destruction of the aircraft and death of the pilot. Such a target, as the pilot undergoing training is aware that a collision can occur without danger to himself, removes the psychological deterrents of the present training methods.

Although the target of the present invention will disintegrate if a collision does occur, yet the target carries means which increases radar reflectivity without the necessity of employing any metallic structural parts. Although the reflector units to be used may include metallic foil or reinforcing structure for the foil, neither the foil nor the reinforcing means, as should be readily understood, present a hazard to the aircraft even if a collision should occur.

The high volume-weight ratio of the material used in the now preferred embodiments of the invention provide a target which can be easily handled by ground installation crews and thus simplifies the installation of the targets to the towing aircraft. Thus the target can be used without the necessity of any special handling equipment for actually a relatively large target can be picked up and carried without difficulty by a single person.

Although the now preferred embodiments of the present invention have been shown and described herein, it is to be understood that the invention is not to be limited thereto, for it is susceptible to changes in form and detail within the scope of the appended claims.

I claim:

1. The combination with an aircraft having remote control releasable support means of: a target having a body of low density, non-metallic frangible material; non-metallic means carried by said body and forming closed loops to be engaged by said support means, whereby said target can be demountably carried by said aircraft; said body having an internal chamber; a tow line of combustible material disposed within said chamber and having one end thereof anchored within the material of said body, the opposite end of said line passed through an opening leading from said chamber to the exterior of said body adjacent the forward end thereof; means securing said opposite end of the line to the aircraft; and electro-responsive means carried by said aircraft adapted, when energized, to incinerate said tow line to thereby sever said target from said towing aircraft.

2. The combination with an aircraft having remote control releasable support means of: a target having a body of low density, non-metallic frangible material; non-metallic means carried by said body and forming closed loops to be engaged by said support means, whereby said target can be demountably carried by said aircraft; said body having an internal chamber, a preformed coil of a tow line of combustible material carried within said chamber, said line having integral enlargements adjacent the one end thereof embedded within the material of said body and anchoring said end to said body, the opposite end of said line passed through an opening leading from said chamber to the exterior of said body adjacent the forward end thereof; means securing said opposite end of the line to the aircraft; and electro-responsive means carried by said aircraft and sleeving a portion of said line adjacent the end secured to said aircraft, said means adapted, when energized, to incinerate said tow line and thereby sever said target from said towing aircraft.

3. An aerial tow target of the type described, comprising: a streamlined, elongate rigid body member having low-drag aerodynamic characteristics and formed of a non-metallic material permeable by radar waves and having an extremely high volume-weight ratio to afford a relatively large target profile for a given weight and to minimize the force of impact in the event of a collision with an aircraft; reflector means carried internally of said body member for reflecting externally propagated radar waves, said reflector means comprising low weight, low strength elements to avoid damage to aircraft inadvertently colliding with said tow target; fin elements carried by the trailing portion of said body member for stabilizing said tow target in towed flight; and means for attaching said target to an aircraft for tow thereby.

4. An aerial tow target as set forth in claim 3 in which said body member is formed of a plurality of interconnected sections of a low density foamed plastic.

5. An aerial tow target as set forth in claim 4 in which the fin elements are formed of a foamed plastic material of a density greater than the density of the foamed plastic of said body sections.

6. An aerial tow target as set forth in claim 3 in which said fin elements comprise a pair of identical stabilizing fins, each having a chord plane intersecting the longitudinal axis of said body member with said chord planes forming a positive dihedral angle, and a third fin having its chord plane normally intersecting said longitudinal axis and forming with each chord plane of each fin of said pair of fins equal angles greater than 90 degrees.

7. An aerial tow target as set forth in claim 3 in which said reflector means comprises a plurality of groups of three normally intersecting elements presenting planar surfaces preselectedly positioned relative to the longitudinal axis of said body member, each of said surfaces having a film of metal applied thereto.

8. An aerial tow target as set forth in claim 3 in which said reflector means comprises a plurality of sheets of metallic foil arranged to provide at least three normally intersecting planes and in which said foil is reinforced and supported by internal wall means of said body member.

9. An aerial tow target of the type set forth in claim 3 in which said reflector means comprises a plurality of groups of at least three normally intersecting elements presenting planar metallic surfaces, said groups being spaced apart longitudinally of said body member with the planar metallic surfaces of said elements mounted in predetermined positions relative to the longitudinal axis of said body member.

10. An aerial tow target of the type described, comprising: a streamlined, elongate rigid body member of non-metallic material permeable by radar waves and having a chamber internally formed therein adjacent the forward portion thereof; a coil of tow line disposed within said chamber; means for anchoring one end of said tow line to said body member; wall means defining a passageway leading from said chamber to said forward portion of said body member for passing the opposite end of said tow line whereby said opposite end may be attached to a towing aircraft; a plurality of reflector means carried internally of said body member for reflecting externally propagated radar waves, said reflector means comprising low strength material to avoid damage to aircraft inadvertently colliding with said tow target; the material of said body member having a high volume-weight ratio to afford a relatively large target profile for a given weight and to minimize the force of impact in the event of an inadvertent collision with an aircraft in the towed flight thereof.

11. An aerial tow target of the type described, comprising: a plurality of body sections each formed of a non-metallic material permeable by radar waves; non-metallic means for interconnecting said body sections to form a streamlined, elongate, rigid body member having low-drag aerodynamic characteristics and an extremely high volume-weight ratio to form a relatively large target profile for a given weight and to minimize the force of impact in the event of a collision with an aircraft; said body sections being so formed as to define, when interconnected together, a chamber internally of the body member formed thereby; a preformed coil of tow line mounted within said chamber with one end thereof extending externally of said body member for attachment to a towing aircraft; and a plurality of reflector means mounted within said chamber for reflecting externally propagated radar waves said reflector means comprising low weight, low strength elements to avoid damage to aircraft inadvertently colliding with said tow target; and fin elements carried by the trailing portions of said body members for stabilizing said tow target in towed flight.

References Cited in the file of this patent

UNITED STATES PATENTS

| | | |
|---|---|---|
| 1,317,958 | Clark | Oct. 7, 1919 |
| 1,930,866 | Warren | Oct. 17, 1933 |
| 1,966,342 | Gerdes | July 10, 1934 |
| 2,148,063 | Evans | Feb. 21, 1939 |
| 2,419,549 | Griesinger | Apr. 29, 1947 |
| 2,463,517 | Chromak | Mar. 8, 1949 |
| 2,483,402 | Cotten | Oct. 4, 1949 |
| 2,591,016 | Schoenherr | Apr. 1, 1952 |
| 2,667,351 | McKinney | Jan. 26, 1954 |